United States Patent [19]

Echte et al.

[11] Patent Number: 4,493,922

[45] Date of Patent: Jan. 15, 1985

[54] IMPACT-RESISTANT THERMOPLASTIC MOLDING MATERIAL

[75] Inventors: Adolf Echte, Ludwigshafen; Hermann Gausepohl, Mutterstadt, both of Fed. Rep. of Germany

[73] Assignee: BASF Aktiengesellschaft, Fed. Rep. of Germany

[21] Appl. No.: 573,853

[22] Filed: Jan. 25, 1984

Related U.S. Application Data

[63] Continuation of Ser. No. 296,894, Aug. 27, 1981, abandoned.

[30] Foreign Application Priority Data

Sep. 20, 1980 [DE]  Fed. Rep. of Germany ....... 3035570

[51] Int. Cl.$^3$ ...................... C08L 55/02; C08L 53/02; C08L 51/04
[52] U.S. Cl. ...................... 525/71; 525/313; 525/314; 525/315; 525/901
[58] Field of Search .......................... 525/71, 901, 315

[56] References Cited

U.S. PATENT DOCUMENTS

| | | | |
|---|---|---|---|
| 3,652,721 | 3/1972 | Dalton et al. | 525/71 |
| 3,787,532 | 1/1974 | Carmelite et al. | 260/876 R |
| 3,903,200 | 9/1975 | Cincera et al. | 525/71 |
| 4,012,462 | 3/1977 | Chaudhary | 260/880 |
| 4,051,197 | 9/1977 | Fodor | 525/901 |
| 4,097,549 | 6/1978 | Kruse | 260/876 R |
| 4,117,035 | 9/1978 | Hillier et al. | 525/901 |
| 4,128,604 | 12/1978 | Katchman et al. | 260/876 R |
| 4,128,605 | 12/1978 | Kishida et al. | 260/876 R |
| 4,128,606 | 12/1978 | Furutachi et al. | 260/878 B |
| 4,146,589 | 3/1979 | Dupre | 260/876 R |
| 4,153,645 | 5/1979 | Lanza | 260/876 R |
| 4,214,056 | 7/1980 | Lavengood | 525/71 |

FOREIGN PATENT DOCUMENTS 2211006 11/1972 Fed. Rep. of Germany .
1422208  1/1976 United Kingdom .

*Primary Examiner*—Carman J. Seccuro
*Attorney, Agent, or Firm*—Keil & Weinkauf

[57] ABSTRACT

An impact-resistant thermoplastic molding material, containing polystyrene as the matrix, and, dispersed therein, two elastomeric polymers or copolymers I and II composed entirely or predominantly of 1,3-dienes and containing particles of different mean size, namely, in I, particles from 0.2 to 0.6 μm in size and having capsule particle morphology, and, in II, particles from 2 to 8 μm in size, having cell particle or coil particle morphology.

1 Claim, No Drawings

IMPACT-RESISTANT THERMOPLASTIC MOLDING MATERIAL

This is a continuation of application Ser. No. 296,894 filed Aug. 27, 1981, now abandoned.

The present invention relates to highly impact-resistant thermoplastic molding materials which essentially contain polystyrene as the matrix and, uniformly dispersed in this matrix, two elastomeric types of particles, of different mean size and present in different amounts, which form the soft phase. The soft phase is essentially composed of polybutadiene or of block copolymers of butadiene and styrene.

The relevant prior art includes
(1) U.S. Pat. No. 4,153,645
(2) U.S. Pat. No. 4,012,462 and
(3) U.S. Pat. No. 4,146,589.

The preparation of styrene polymers with high gloss is known; it is also known that good mechanical properties of such styrene polymers can be achieved by employing a broad or bimodal particle size distribution [cf. (3) and (1)].

However, it has not hitherto proved possible to combine these two properties satisfactorily with one another.

It is an object of the present invention to provide thermoplastics, based on impact-resistant styrene polymers, which have high gloss combined with good mechanical properties.

We have found that this object is achieved, surprisingly, starting from the prior art as known, for example, from (1), if the soft phase of the thermoplastic molding material has the particle morphologies identified in the characterizing clause of the claim.

Accordingly, the invention relates to impact-resistant thermoplastic molding materials which essentially contain A. polystyrene as the matrix and B. uniformly dispersed therein, two elastomeric polymers or copolymers ($b_1$) and ($b_2$), predominantly composed of 1,3-dienes, in an amount of from 3 to 30% by weight, calculated as polybutadiene and based on the matrix, the polymers or copolymers being present as particles of different mean size (different $d_{50}$ of the cumulative mass distribution), namely ($b_1$) as particles of 0.2–0.6 μm, in a proportion of 60–95% by weight, based on polybutadiene, and ($b_2$) as particles of 2–8 μm, in a proportion of 40–5% by weight, based on polybutadiene, with or without C. conventional additives, in effective amounts, in which final molding material the polymer or copolymer ($b_1$) has a capsule particle morphology and the polymer or copolymer ($b_2$) has a cell and/or coil particle morphology.

As component A, the molding material according to the invention essentially contains polystyrene which is produced, in the course of preparing the molding material, by continuous polymerization of a monomeric aromatic vinyl compound in the presence of elastomeric polymers; alternatively, two polystyrene resins which have already been rendered impact-resistant and which may or may not be commercially available can be mixed by melting, or dissolving and then evaporating the solvent.

The molding material according to the invention contains two elastomeric polymers or copolymers ($b_1$) and ($b_2$), which together are present in an amount of from 3 to 30% by weight, based on the matrix and calculated as pure polybutadiene. A particularly preferred amount is from 4 to 20% by weight, based on the matrix. The polymer or copolymer ($b_1$) is present in an amount of from 60 to 95% by weight, preferably from 70 to 85% by weight, based on polybutadiene and consists of particles of mean diameter from 0.2 to 0.6 μm. For the purposes of the present invention, the mean particle diameter is the $d_{50}$ of the cumulative mass distribution. It is determined in a manner known to a skilled worker, by measuring the particles in electron micrographs (cf. F. Lenz, Z. f. wiss. Mikroskopie 63 (1956), 50–56). The elastomeric polymer or copolymer ($b_1$) has a capsule particle morphology; the nature of such a morphology, and the manner in which it can be produced, is known to a skilled worker (cf. Angew. Makromol. Chem. 58/59 (1977) 175–198). To achieve the capsule particle morphology of component ($b_1$) of the molding materials according to the invention, polybutadienes or styrene/butadiene block copolymers can be employed, within the composition limits known to a skilled worker. It is merely necessary that the latter should establish the polymerization conditions by a few exploratory experiments, involving the taking of samples during the prepolymerization stage which is critical for the development of the morphology.

The polymer or copolymer ($b_2$) is present in an amount of from 40 to 5% by weight, preferably from 30 to 15% by weight, in each case based on polybutadiene. The particles have a mean diameter of from 2 to 8 μm, preferably from 3 to 6 μm. It is essential that the polymer or copolymer ($b_2$) should either have the conventional cell morphology known from the case of impact-resistant polystyrene, or should be treated so as to create a coil particle morphology. The preparation of elastomeric polymers having coil morphology is within the capabilities of a skilled worker, in the light of the disclosures of the publications cited at the outset (loc. cit. 1–3).

In addition to components A and B, the novel thermoplastic molding materials can contain, as a further component C, conventional additives for impact-resistant styrene polymers. Examples of such additives include fillers, other compatible plastics, dyes, pigments, antistatic agents, antioxidants, flameproofing agents and lubricants. These additives are employed in the amounts known to a skilled worker.

The molding materials according to the invention can be prepared by the processes known to a skilled worker. For example, two impact-resistant polystyrenes, which each contain polystyrene as the matrix and respectively contain the elastomeric polymers ($b_1$) and ($b_2$), can be mixed by melting. Mixing of such materials can also be carried out in solution, with subsequent devolatilization. Equally, it is possible to prepare two different graft polymers by a continuous process, the prepolymerization, with adjustment of particle size and morphology of the particles, being carried out separately and the two prepolymers then being combined in a certain ratio, after which the polymerization is carried out conjointly up to the desired high solids content of, for example, 80 or 90%.

The molding materials according to the invention can be converted to very diverse shaped articles by conventional thermoplastic processing methods, such as extrusion and injection molding.

The gloss was measured by a Dr. Lange Multiflex galvanometer on samples injection-molded from the product at 260° C. The relative reflection from the surface of these moldings is measured as a percentage of the incident light. The standard used is filter paper, having a reflectance of 0%.

The notched impact strength, $a_{KL}$ (kJ/m$^2$) is determined in accordance with the DIN draft, in preparation, based on the decision of the Plastics Standards Committee 4.3 of March 1975.

The Examples and Comparative Experiments which follow illustrate the invention. All parts and percentages are by weight, unless stated otherwise.

EXAMPLE 1

10 parts of an impact-resistant polystyrene (a) having a rubber particle diameter of 5–6 μm were mixed with 90 parts of an impact-resistant polystyrene (b), having a capsule particle morphology (diameter: 0.4 μm) on an extruder at 230° C.

The product (a) had a cell particle morphology and a polybutadiene content of 8%.

The product (b) had a polybutadiene content of 9%.

The mixture obtained had a reflectance of 68%; its notched impact strength, $a_{KL}$, was 13.4 kJ/m$^2$.

COMPARATIVE EXPERIMENT

Product (b) has a reflectance of 71% and a notched impact strength of only 10.2 kJ/m$^2$. Product (a) has a notched impact strength of 11.5 kJ/m$^2$ and a reflectance of only 22%.

EXAMPLE 2

Example 1 was repeated, but mixing 30 parts of product (a) with 70 parts of product (b). The mixture had a reflectance of 60% and a notched impact strength $a_{KL}$ of 15.8 kJ/m$^2$.

EXAMPLE 3

A solution of 12 parts of a styrene-butadiene block copolymer (60 B/40 S) in 6 parts of ethylbenzene, 2 parts of paraffin oil, 0.02 part of tert.-dodecylmercaptan and 79.98 parts of styrene was polymerized continuously to a solids content (SC) of 40%. The product assumed a capsule particle morphology. This material was component (a).

Similarly, a solution of 2.2 parts of a medium-cis-polybutadiene and 8.4 parts of a styrene-butadiene block copolymer (60 B/40 S) in 6 parts of ethylbenzene, 2 parts of paraffin oil, 0.02 part of tert.-dodlecylmercaptan and 81.38 parts of styrene was continuously prepolymerized to a solids content of 40%. The product had a coiled ball morphology, with a mean particle size of about 6 μm. This constituted component (b). The two prepolymers were then combined in a ratio of a:b=4:1 and polymerization was continued to a solids content of 80%, after which the solvents and other volatile constituents were removed in a conventional manner.

The impact-resistant polystyrenes obtained in each case had the same morphology and particle size distribution as the relevant prepolymers a and b. The end product had a reflectance of 63% and a notched impact strength $a_{KL}$ of 17.2 kJ/m$^2$.

We claim:

1. An impact-resistant thermoplastic molding material which essentially contains
   A. polystyrene as the matrix and
   B. uniformly dispersed therein, two elastomeric polymers or copolymers (b$_1$) and (b$_2$), predominantly composed of 1,3-dienes, in an amount of from 3 to 30% by weight, calculated as polybutadiene and based on the matrix, the polymers or copolymers being present as particles of different mean size (different d$_{50}$ of the cumulative mass distribution), namely
      (b$_1$) as particles of 0.2–0.6 μm, in a proportion of 60–95% by weight, based on polybutadiene, and
      (b$_2$) as particles of 2–8 μm, in a proportion of 40–5% by weight, based on polybutadiene, with or without
   C. conventional additives, in effective amounts, in which final molding material the polymer or copolymer (b$_1$) has a capsule particle morphology and the polymer or copolymer (b$_2$) has a cell particle morphology, a coil particle morphology or a cell and coil particle morphology.

* * * * *